United States Patent
Dimou et al.

(10) Patent No.: US 8,369,857 B2
(45) Date of Patent: Feb. 5, 2013

(54) SPEED-DEPENDENT ADAPTATION OF MOBILITY PARAMETERS WITH DUAL SPEED MEASUREMENT

(75) Inventors: Konstantinos Dimou, Stockholm (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 458 days.

(21) Appl. No.: 12/740,558

(22) PCT Filed: Jun. 2, 2008

(86) PCT No.: PCT/SE2008/050641
§ 371 (c)(1),
(2), (4) Date: Apr. 29, 2010

(87) PCT Pub. No.: WO2009/058069
PCT Pub. Date: May 7, 2009

(65) Prior Publication Data
US 2010/0298001 A1 Nov. 25, 2010

Related U.S. Application Data

(60) Provisional application No. 60/984,848, filed on Nov. 2, 2007.

(51) Int. Cl.
*H04W 36/00* (2009.01)

(52) U.S. Cl. ............ 455/441; 455/67.11; 455/423; 455/436; 370/252; 370/331; 370/332

(58) Field of Classification Search .......... 455/67.11, 455/69, 238.1, 423, 424, 425, 432.1, 436, 455/437, 438, 439, 440, 441, 442, 443, 444, 455/524, 525, 550.1, 561; 370/252, 310.2, 370/328, 331, 332, 338; 701/110, 119, 121; 342/461; 324/160, 161
See application file for complete search history.

(56) References Cited

U.S. PATENT DOCUMENTS

| 6,542,471 | B1 * | 4/2003 | Ito .................................. 370/252 |
| 6,711,384 | B2 * | 3/2004 | Kubo et al. ...................... 455/68 |
| 7,082,304 | B2 * | 7/2006 | Wakabayashi ................ 455/441 |
| 7,221,318 | B2 * | 5/2007 | Chang et al. .................. 342/372 |
| 7,280,835 | B2 * | 10/2007 | Usuda et al. ................... 455/450 |
| 2005/0037760 | A1 * | 2/2005 | Maruyama ..................... 455/441 |
| 2009/0156212 | A1 * | 6/2009 | Motegi et al. ................. 455/436 |

OTHER PUBLICATIONS

Anpalagan, A. S. et al. "Cellular System Design with Cell Selection Criteria for Mobile Wireless Users." Proceedings of the 1999 IEEE Canadian Conference on Electrical and Computer Engineering, Straw Conference Center, Edmonton, Alberta, Canada, May 9-12, 1999.

(Continued)

*Primary Examiner* — Anthony Addy
(74) *Attorney, Agent, or Firm* — Coats & Bennett, P.L.L.C.

(57) ABSTRACT

Mobility parameters, such as those used in handoff decisions, are based on the speed of User Equipment (UE) (10), measured at two points. UE speed estimates are taken at both the UE (10) and base station (12), and the two speeds compared. If the speeds match (or differ by less than a predetermined amount), one or more mobility parameters are adapted based on the UE speed. These parameters may include time to trigger (TTT), time to satisfy (TTS), measurement time, forgetting factor, $\beta$, measurement period ($T_m$), handover prohibit timer, MeasurementReporting$_{margin}$, HO$_{margin}$, hysteresis, and the like. The UE speed comparison may be performed at the UE (10) or at the base station (12). In one embodiment, a plurality of UE speed ranges are defined (e.g., low, medium, high), with corresponding mobility parameter values associated with each range.

32 Claims, 5 Drawing Sheets

OTHER PUBLICATIONS

Li, S. et al. "Adaptive Frame Switching for UMTS UL-EDCH—Ping-Pong Avoidance." IEEE 63rd Vehicular Technology Conference, 2006 (VTC 2006—Spring), vol. 5, May 7-10, 2006.

Winter, T. "Mobility Management and Network Design for UMTS." 15tth IEEE International Symposium on Personal, Indoor and Mobile Radio Communications, 2004 (PIMRC 2004), vol. 1, Sep. 5-8, 2004.

* cited by examiner

SPEED-DEPENDENT ADAPTATION OF MOBILITY PARAMETERS WITH DUAL SPEED MEASUREMENT

TECHNICAL FIELD

The present invention generally relates to mobile communications, and particularly relates to the adaptation of handoff parameters based on User Equipment (UE) speed measured at the UE and a base station.

BACKGROUND

Mobility management is a critical aspect of any wireless communication system, from the early analog systems to modern digital systems such as GSM, 3GPP, Long Term Evolution (LTE), and the like. Fundamental to mobility management is the ability of a user to move geographically while maintaining operative connectivity with the system. To accomplish this, the user's mobile terminal—referred to herein by the more general term User Equipment (UE)—establishes service with successive serving base stations (also known as Node B) as the user travels. The process of transferring service from one serving base station to another is known as handoff (HO).

The decision for HO of a UE from a current (serving) base station to another one is generally made by the network. Whether or not to hand over a UE is based primarily on comparing either the received signal strength (RSS), or the signal to interference plus noise ratio (SINR), or a combination of both, of signals received from two or more base stations. RSS is usually measured over pilot signals transmitted by a base station.

A number of parameters are considered in the comparison. For example, the RSS of an adjacent base station should exceed the RSS of the current serving base station by a predetermined margin, and for a predetermined duration. This helps to reduce the "ping-pong effect" of a UE being handed back and forth between two base stations when positioned where their corresponding cells overlap. A "handover prohibit timer," which defines the minimum time duration between two consecutive handovers, also mitigates this effect. These parameters typically are maintained at the base station (or elsewhere in the network), which makes the HO decision.

A number of HO-related parameters are maintained and utilized by the UE. For example, while the UE may make RSS measurements often, to reduce signaling these measurements are not all reported to the base station. Only when a measurement exceeds a threshold for a predetermined duration, for example, would it be reported. Both the threshold value and the corresponding "Time To Trigger" (TTT) duration are HO parameters with which the UE is provisioned. The RSS, or other measured value, may be filtered over a measurement window, to reduce transient effects, prior to reporting the value. The duration of the measurement window, and a parameter related to the weight to be given prior measured values, are additional HO-related parameters.

HO is performed when the UE is in active mode. A similar procedure, cell reselection, is carried out by the UE in idle mode. Several parameters associated with cell reselection are broadcast by the network to UEs, such as a serving cell strength or/and quality threshold, a factor indicating how often the UE should evaluate cell reselection criteria, and a hysteresis value.

In general, the optimal values of various measurement, HO, and HO-related parameters depend heavily on the speed of the UE. For example, a parameter specifying the duration over which a factor such as RSS should be measured may optimally be relatively long for a slow-moving UE, to filter the effects of fast fading. However, a fast-moving UE would optimally measure the RSS over a shorter duration since the channel experienced by the UE may be changing rapidly. Conforming the HO parameters to the UE speed would result in more accurate HO performance—i.e., fewer unnecessary HOs. One way to determine the speed of a UE is by measuring the Doppler shift in its signal carrier frequency. This requires the UE to be in active mode to estimate speed, leading to poor HO parameter selection performance in idle mode or active mode employing discontinuous reception (DRX). The UE speed may alternatively be measured at the base station. This requires increased signaling overhead to frequently transmit updated HO parameters to the UE. In either case, an error in UE speed measurement that leads to inappropriate adaptation of HO parameters will reduce HO performance by generating unnecessary HO events.

SUMMARY

According to one or more embodiments disclosed herein, UE speed estimates are taken at both the UE and base station, and the two speeds compared. If the speeds match (or differ by less than a predetermined amount), one or more mobility parameters are adapted based on the UE speed. These parameters may include time to trigger (TTT), time to satisfy (TTS), measurement time, forgetting factor, $\beta$, measurement period ($T_m$), handover prohibit timer, MeasurementReporting$_{margin}$, HO$_{margin}$, hysteresis, and other mobility related parameters. The UE speed comparison may be performed at the UE or at the base station. In one embodiment, a plurality of UE speed ranges are defined (e.g., low, medium, high), with corresponding mobility parameter values associated with each range.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
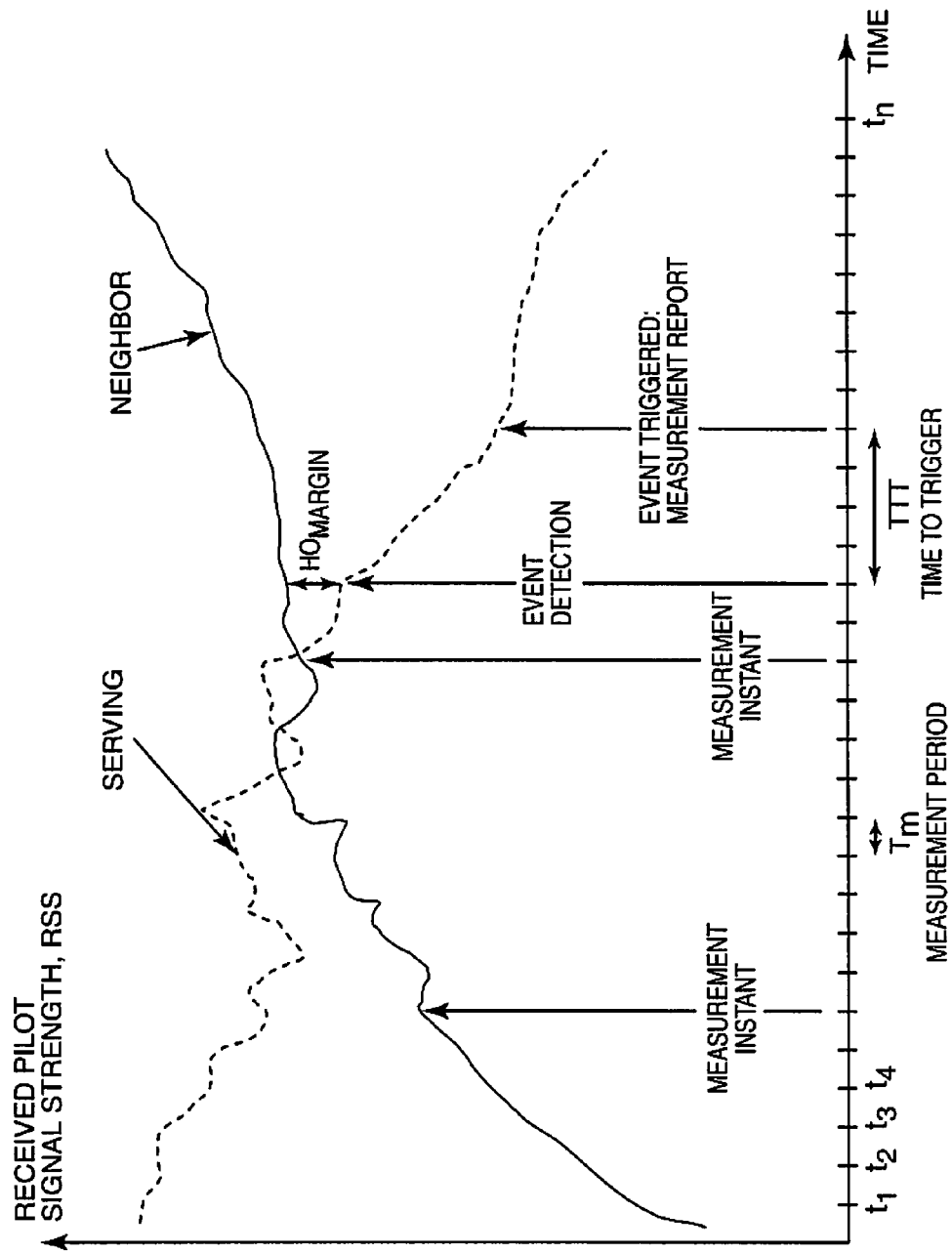
FIG. 1 is a representative graph of received signal strength (RSS) as a UE moves from a serving cell to a neighboring cell.

FIG. 1 depicts some of the timings and other parameters associated with measurement reporting and HO as a UE moves from a serving cell (i.e., signals transmitted by a serving base station) to a neighboring cell. As used herein, the terms cell and base station are interchangeable, unless the context indicates otherwise, since it is generally the case that one base station controls one cell.

When the received signal strength (RSS) of received pilot signals is used for HO decisions, a UE may be handed over to a new cell when the RSS for a pilot signal received from an adjacent base station "B", $RSS^B$, is higher than the received signal strength for a pilot signal received from the serving base station "A", $RSS^A$, multiplied by a handover margin, $HO_{margin}$.

$$RSS^B \geq RSS^A * HO_{margin}. \tag{1}$$

In Equation (1), values of RSS and $HO_{margin}$, are given in linear scale.

Before a HO decision is made, Equation (1) might, in some systems, be required to be satisfied for a specified time duration, the "Time to Satisfy" (TTS). The main motivation for having these parameters, $HO_{margin}$ and TTS, is to reduce ping-pong effects. Often, these parameters are network dependent. However, it is feasible that one or more of these parameters be cell-dependent as well, i.e., varying from one cell to another. Typically, in previous and currently planned cellular systems, a UE performs measurements of RSS and/or SINR, and reports the measurement results to the serving base station. In most cases, the UE performs these measurements over the serving cell and over a number N of adjacent cells. This group of cells, comprising the serving cell and a number N of adjacent ones, is often termed the "measurement set." Upon reception of measurements from a UE, the base station can perform the comparison described in Equation (1) and make the HO decision if the condition is satisfied for a time window TTS. Since the parameters $HO_{margin}$ and TTS are used internally by the base stations, they do not necessarily have to be transmitted to UEs. However, in the WCDMA-based version of 3GPP, the $HO_{margin}$ is transmitted to the UEs. This is so that UEs may report measurements of RSS or SINR in an "event-triggered" way. In most cases, an event occurs if a formula similar to Equation (1) is satisfied.

Another parameter used by the network to reduce the ping-pong effect is the "handover prohibit timer," which defines the minimum time duration between two consecutive handovers. This parameter is also used internally in the base station and hence there is generally no need for this parameter to be transmitted to the UEs.

As mentioned above, measurements of the received RSS and the SINR over the pilot are performed by the UEs periodically. In the case of a HO decision, it is assumed that the UE is connected to its serving cell and has an active link. Hence, any required UE measurements must be performed while in connected mode.

Not all of the measurements done by a UE are reported to its serving base station, due to the prohibitive amount of signaling over the radio interface that would be generated. Typically, a UE reports measurements only when the measured parameters exceed certain thresholds for a given time duration. As an example, in 3GPP systems, these time durations are termed "Time To Trigger" (TTT), and a number of events are defined for various different cases when the measured parameters exceed predefined thresholds. For instance, one event might occur when the pilot strength from an adjacent cell, not currently belonging to the active set, exceeds a predefined threshold. Indications of the applicable trigger events, and the corresponding TTT values, are transmitted from base stations to the UEs. The latter store them and report their measurements only when events are triggered.

In WCDMA-based 3GPP systems, an "event" occurs when the UE has to start reporting its measurements. This happens when the UE moves far from its serving base station (evolved Node B, or eNB). In this case, the RSS from the serving cell decreases and the RSS from an adjacent cell increases. In this case, this event occurs when the RSS received from an adjacent cell ($RSS^B$) satisfies a formula similar to:

$$RSS^B \leq RSS^A * MeasurementReport1_{margin}, \tag{2}$$

i.e. when the RSS from an adjacent cell is within the same range as the RSS from the serving cell ($RSS^A$). $MeasurementReport1_{margin}$ should have typically a value less than 1 (in contrast to $HO_{margin}$, which often has values greater than 1 and in certain few cases it has values lower than 1). In logarithmic scale, it typically has negative values, while $HO_{margin}$ typically has positive values.

Another option is that the UE starts reporting measurements once the RSS from the serving cell ($RSS^A$) goes below a threshold, e.g., it satisfies the formula:

$$RSS^A \leq MeasurementReport2_{margin}. \tag{3}$$

Note that, in general, TTS and TTT are different parameters. TTS defines the time period over which a condition has to be satisfied before a HO decision is made at the base station (or network side). TTT is the time period over which a condition has to be satisfied before a measurement report is sent by the UE to the base station. In the WCDMA-based versions of 3GPP, often TTS=TTT. In this case, the radio network controller (RNC), which is the part of the access network that receives the measurement reports, upon reception of the measurement report, performs soft or softer HO after evaluating cells to be included in the active set.

Another parameter that may be involved in the HO procedure is the so-called "measurement window" or "measurement period" $T_m$, which defines a period over which the RSS and channel quality are averaged. In addition, the measured output may be filtered according to:

$$RSS_{filtered}(nT_m) = \beta \cdot RSS(nT_m) + (1-\beta) \cdot RSS((n-1)T_m). \tag{4}$$

The filtered RSS at the current measurement time instant, $nT_m$, is equal to the current measurement output, $RSS(nT_m)$ multiplied by a memory factor $\beta$, plus the weighted previous measurement, $RSS((n-1)nT_m)$. Usually, the memory factor $\beta$ is set to a value equal to the ratio of the measurement period $T_m$ to the time to trigger (TTT):

$$\beta = \frac{T_m}{TTT}. \tag{5}$$

Typically, each measurement is brought to layer 3 in the UE, where it is filtered according to formula (4).

Upon reception of the measurement report at the relevant network component—the RNC in a WCDMA-based 3GPP system, or the evolved Node B (eNB) in a 3GPP LTE system—the network may evaluate immediately whether it is feasible to perform a HO. Alternatively, it may wait until another measurement report arrives. In the WCDMA-versions of 3GPP, the RNC evaluates and executes the HO. In this case, the TTS is equal to TTT. Setting the TTS greater than TTT increases the HO execution delay, but very likely also reduces the number of unnecessary HOs. In addition, the setting of TTS value heavily depends on the TTT value, in case the TTT is set to a value which results in a filtering of the fast fading coefficient, then a good choice for the ITS would be to set it equal to TTT. In this case, unnecessary HOs that are triggered due to fast fading are very likely avoided.

Similar logic applies for other HO parameters, e.g., setting the $MeasurementReporting_{margin}$ (either of the two presented above) criterion in an "aggressive" manner—that is, setting it to values that provide frequent reporting—gives an accurate monitoring of the radio channel of the UEs and consequently reduces the number of unnecessary HOs. However, the frequent reports generate a heavy signaling load. Depending on the nature of channel variations, an accurate tracking of the channel may not provide any additional information. For example, in the case of a very fast moving user, the channel varies so dynamically that the fast fading variations are filtered out, and hence what is mainly depicted in a measurement is the average path gain.

As noted, for HO decisions, the UE is connected to a serving base station, and is in active mode. Cell reselection is a related mobility management function, which is carried out by the UE in idle mode or in active mode during discontinuous reception (DRX). Cell reselection is controlled by the network by broadcasting a number of parameters, which are generally common to all users in a cell. Typical parameters include:

Ssearch: UE starts measuring the target cells when serving cell strength or/and quality fall below this level.

T_reselection: defines the intensity of cell reselection attempts, i.e. how often UE should evaluate cell reselection criteria Hysteresis: used by the UE for comparing the serving and target cells Other cell reselection parameters that are similar to those used in connected mode HO include measurement period and time to trigger.

Setting the above-described HO and/or cell reselection related parameters so as to avoid unnecessary HOs and cell reselections is challenging. The task is complex, since different radio channel conditions require different parameters values for optimal HO and cell reselection performance. One factor in particular that significantly affects radio channel conditions is the UE speed. As an example, consider a network with a $HO_{margin}$ set to a typical value of 3 dB for the event that occurs when the RSS from an adjacent cell becomes stronger than the RSS from the serving cell, and the TTT is set to a typical value of 1 second. Consider further that a UE is within a vehicle moving at 120 km/h (=33.4 m/sec), for example on a ring road for a big city, so that the propagation environment is typical urban. The path loss due to radio attenuation g can be given by the Okumura-Hata formula:

$$g = 128.1 + 37.6 \cdot \log_{10}(R) \quad (6)$$

where the distance R is in km and attenuation g is in dB.

A likely 3GPP LTE radio network deployment in a city would involve sites, where each site controls a sector consisting of 3 cells, with an inter-site distance around 500 m. Assume further that the user is at the border of two cells, e.g., 300 m away from the serving site, when it is detected that the RSS from an adjacent site is 3 dB higher than the RSS from the serving site. Hence, an event is triggered within the UE and the TTT timer starts. If the UE is moving towards the adjacent site at the speed of 120 km, in the 1-second TTT interval, the UE will have moved to a distance of 333 m from its serving eNB. Considering only the radio propagation loss (no shadowing to the sites that are located in tall buildings) and assuming that the fast fading is filtered out by the high speed, then according to Equation (6), the radio propagation path loss thus increases from approximately 108 dB to approximately 110 dB. Hence, very likely the RSS that is received from the adjacent sector is more than 5-6 dB stronger than the RSS from the current sector by the time HO is actually performed. An additional effect is that, in this case, when the network transmits the HO COMMAND to the UE, significant amount of DL interference to adjacent UEs in neighbor cells is created.

On the other hand, for a slow moving UE, a TTT interval of 1 second might be too short, not sufficiently filtering out the fast fading effect. Similar considerations apply for the $HO_{margin}$, i.e., a low $HO_{margin}$ value might be optimal for fast moving UEs, but not for slower ones. In similar manner, the memory factor β may provide optimal performance for low UE speeds when it is set to a low value (i.e., close to 0), but not for high UE speeds. The opposite behavior may be observed when the memory factor β is set to a value close to 1, in which case the performance is likely better (meaning fewer unnecessary HOs) for fast moving UEs. The same applies for the measurement period, but for this case the HO performance is the opposite than for the memory factor β. Hence, a shorter measurement period results in better performance for higher UE speeds than for lower ones. Similar rules dictate the performance with respect to the $MeasurementReporting_{margin}$ parameters—for a fast moving UE, it is more beneficial when the measurement reporting is triggered early enough, so that the handover messages are exchanged before the connection to the serving cell is lost.

Similar issues have also been identified in the case of cell selection, which is a mobility management mechanism applicable when the UE is in idle mode. In order to mitigate these problems, it has been suggested that in future systems, cell selection parameters are adapted as a function of UE speed. For example, in one proposed mechanism the Doppler shift and the number of cell selections within a given time window are used to detect UE speed, and considered for the adaptation of cell selection parameters. However, since the UE is in idle mode, there is no mechanism for explicitly commanding the UE (or notifying the base station) that a mobility related parameter has been adapted.

In general, wireless operators have shown keen interest in developing methods that would allow the adaptation of the mobility related parameters as a function of UE speed. One reason is that UE and base station requirements are being specified for very large range of speed varying from pedestrian speeds to speeds of 350-400 km/hr. The highest speed levels are generally used for high-speed train scenarios, where base station sites are deployed along side the rail tracks. Cell reselection and handover rates in these scenarios are very large and extensive. Mobility performance can be considerably improved if at least some of the mobility related parameters are adapted in accordance with the UE speed. Operators have stated a preference for at least 3 levels of speed—low, medium and high—to be applied to scaling the corresponding set of mobility related parameter values.

One proposed, prior art mechanism to adapt HO related parameters and the HO threshold as a function of the speed is located at the eNB, and no explicit signaling to the UE is involved. That is, the UE is not aware of the origin of the changes it is required to perform. When the RSS reported by a UE falls below a given threshold, the eNB measures the speed at which the RSS reported by this UE deteriorates. When the RSS reported by the UE deteriorates with a higher speed than a predefined threshold, then the UE is directed by the network to report its quality with higher frequency, i.e., at shorter time intervals than before. At every measurement report, the eNB makes a prediction of the next measurement report. The base station defines the signal quality value which will result in a HO. If a measurement report falls below this HO threshold, the UE is commanded to perform a HO. A similar mechanism is suggested for UEs moving slowly, in which case the measurement intervals are longer.

This mechanism is robust under good channel conditions. However, it may significantly increase signaling, and may not behave well if the UE moves very fast, which would imply reporting signal quality very often. Additionally, the mechanism might increase the complexity at the eNB, since it requires that the eNB predicts the received signal quality of the next measurement report.

In WCDMA systems, a timer controls when a cell is removed from the active set. A cell is removed from active set if received signal quality from a cell falls below T_Drop after a time period of T_Drop_Timer has elapsed. Another prior art proposal is to adapt the values of T_Drop and T_Drop_Timer as a function of the UE speed, its position in the cell, and the number of HOs the UE has executed.

In general, the known prior art approaches consider either adaptation of the mobility parameters solely by the speed estimation at the UE, or adaptation of mobility parameters solely by the speed estimation at the base station. There are at least two main limitations of these approaches. The first mechanism, where speed estimation is only done at UE, is appropriate only if UE is in continuous reception mode. For instance, Doppler estimation requires UE to continuously monitor some sort of pilot signals for several consecutive frames e.g. 50-80 ms. In idle mode, or in active mode with discontinuous reception (DRX), speed estimation only at the UE would excessively drain UE battery power. The second mechanism, where speed estimation is only done at the base station, would lead to unnecessary signalling overheads. This is due to the fact that base stations will have to frequently signal the parameters to the UE. For example, the speed estimation in connected mode at a base station for mobility decisions (e.g., in a hierarchical cell structure) may have to be done every 100 ms.

To adapt mobility related parameters as a function of UE speed implies that the UE speed can be measured. This may be accomplished in several ways. Many modern UE include position estimation hardware, such as satellite navigation signal reception and processing. In UEs thus equipped, UE speed estimate is performed by simply calculating the distance between successive position fixes, divided by the elapsed time.

In UE not equipped with position estimation facilities, measuring the speed of a UE is feasible by making use of the Doppler effect. The Doppler spectrum is measured at the receiver of an electromagnetic signal. Several methods of measuring the Doppler frequency at a UE are known. For example, one known method of measuring the Doppler frequency is to take samples of the phase shift of the pilot signal received at the UE demodulator. From the measured Doppler frequency, fm, the relative speed between the transmitter and the receiver, hence the UE speed, is estimated by the formula:

$$f_m = \frac{fv}{c}, \qquad (7)$$

where f is the carrier frequency, v is the relative speed between the transmitter and the receiver and c is the speed of electromagnetic waves. Using this formula, it is possible to measure the Doppler spectrum and consequently the UE speed at the UE. Since formula (7) gives the relative speed between a base station and a UE it is readily apparent that the UE speed can be measured at the base station receiver as well.

Other methods of measuring the UE speed are known in the art. For example, UE speed may be estimated based on a measurement of the fast fading change. Time difference of arrival (TDOA) of signals from two base stations to a UE are known for estimating position—successive position fixes may be taken to estimate speed. Combinations of two or more techniques might also be used to estimate mobile terminal speed. In general, UE speed may be measured or estimated for the purposes of the present invention according to any technique known in the art or yet to be developed.

Figure 2:
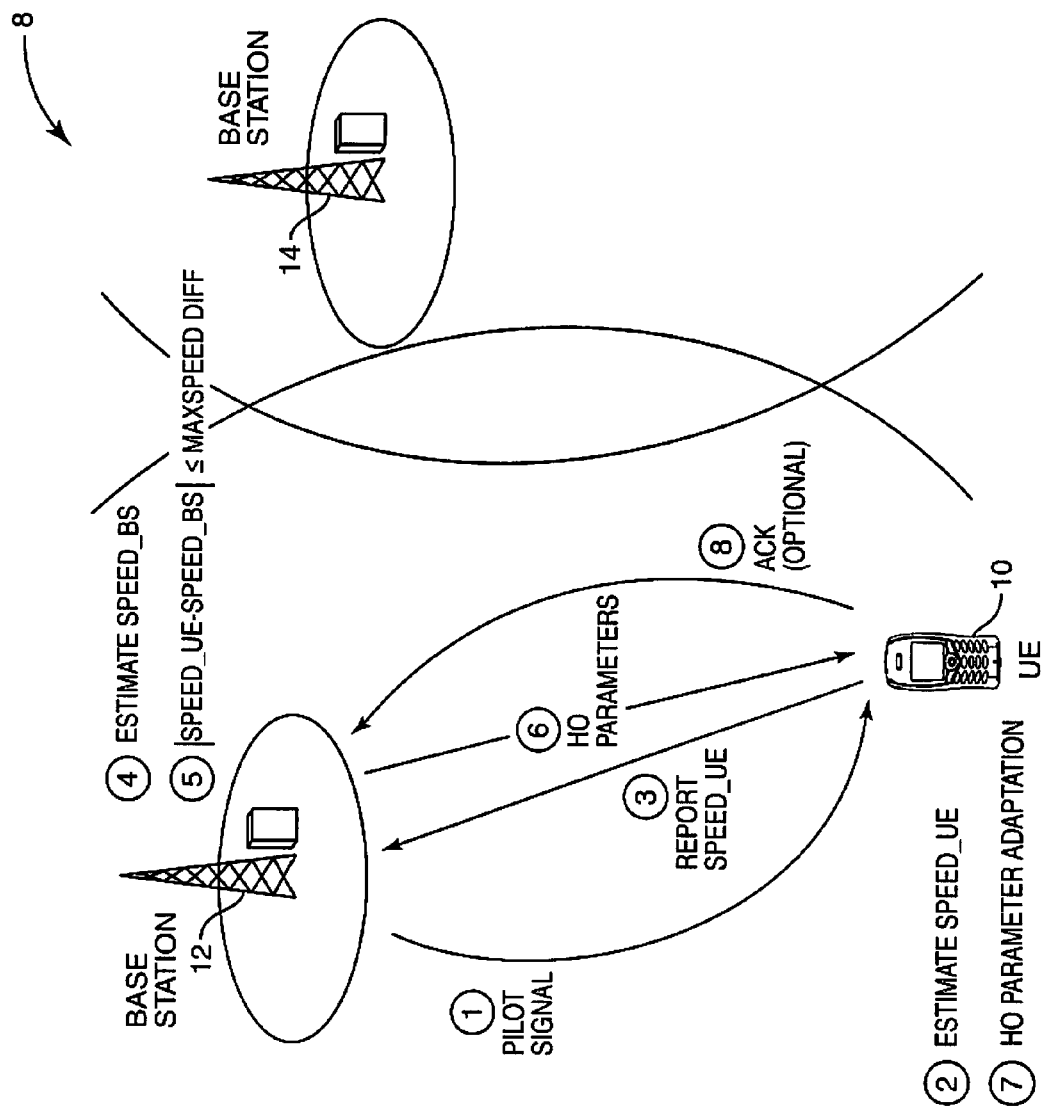
FIG. 2 is a diagram depicting measurement and signaling steps when speed comparison is performed in the base station.

According to the present invention, UE speed is measured at the UE, and additionally is measured at the network as well. Measurements from both sides are compared, either at the UE, or at the base station. If measurements lie in the same range of values, then HO related parameters are adapted in accordance with the UE speed. FIG. 2 illustrates this procedure, according to one embodiment of the present invention. FIG. 2 depicts part of a wireless communication network 8, including a serving base station 12 and a neighboring base station 14. A UE 10 is in active communication with the serving base station 12.

The UE 10 receives a pilot signal from the base station 12 at step 1. The UE 10 measures its speed SPEED_UE at step 2 (such as from a Doppler shift in the received pilot signal), and reports SPEED_UE to the serving base station 12 at step 3. The reporting can be done either periodically, or in an event-triggered manner, e.g., when the UE 10 speed has changed by N km/h in comparison to its previous speed. This is one option for the event triggering the reporting of the UE speed. Another option is that a number of speed ranges, e.g., low, medium, and high, are defined. In either case, the value of the speed delta threshold N, or the speed ranges, and the HO parameters that are associated with them, may be broadcast to all users. For the purpose of the following explanation, assume that three speed ranges are defined, and that the ranges and their corresponding HO parameters are broadcast to all of users. Of course, various speed ranges may be defined, and more or fewer than three may be used.

The base station 12 measures the UE speed, SPEED_BS, and compares it to SPEED_UE measured at the UE 10 at step 5. The base station 12 determines whether the difference in speeds is within a maximum speed difference (step 5), according to:

$$|SPEED\_UE - SPEED\_BS| \leq MaxSpeedDiff \qquad (8)$$

If so, the base station 12 may transmit the relevant HO related parameters to the UE 10 at step 6. Alternatively, the base station 12 may simply transmit an acknowledgement to the UE 10, indicating to the UE 10 that it may apply the HO parameters (previously supplied) that correspond to the speed the UE 10 has determined. As an option, the UE 10 may acknowledge these HO parameters at step 8, or the range among which it chooses HO parameters.

If, at step 5, equation (8) indicates that the measured UE speeds SPEED_UE and SPEED_BS are not within the same range, then no action is taken by the base station 12. Consequently, the UE 10 proceeds with the next UE speed measurement without any further action. In this case, the UE 10 applies a predefined set of HO parameters, e.g., the HO parameters that apply for medium UE speeds.

Figure 3:
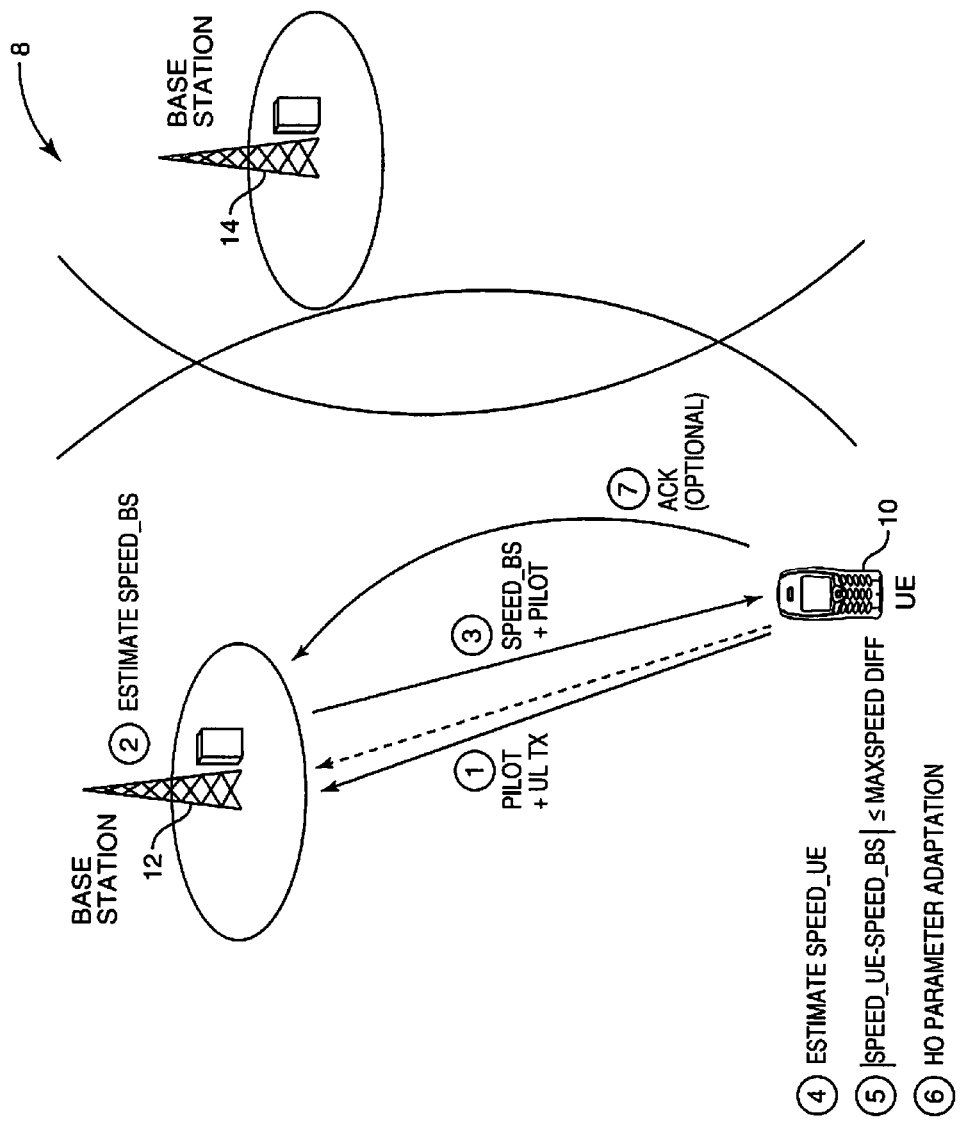
FIG. 3 is a diagram depicting measurement and signaling steps when speed comparison is performed in the UE.

FIG. 3 illustrates the inventive speed-based HO parameter adaptation procedure, according to another embodiment. Preliminarily, as above, the base station 12 broadcasts the speed ranges and HO parameters for each to all UEs 10 in the cell. The UE 10 transmits a pilot signal and an uplink transmission to the base station 12, at step 1. On the basis of Doppler frequency shift in the pilot and/or uplink signal, the base station 12 estimates the UE speed, SPEED_BS at step 2. Note that the Doppler-derived SPEED_BS is the relative speed between the base station 12 and the UE 10, and equates to UE speed only if the base station 12 is assumed stationary. The base station 12 transmits SPEED_BS (or in one embodiment, the speed range in which the UE 10 belongs based on SPEED_BS) to the UE 10 at step 3. The UE 10 estimates its own speed, SPEED_UE, at step 4, and compares it to SPEED_BS at step 5. If the speed estimates are within a predetermined range, then the UE 10 adapts its handover parameters accordingly, at step 6, using values previously broadcast by the base station 12. The UE 10 may optionally send a notification to the base station 12 with the HO parameters it uses, as an acknowledgment to the base station 12, at step 7. If SPEED_UE and SPEED_BS differ too widely, no action is undertaken, or a predefined set of HO parameters is used, as described above with respect to FIG. 2.

As readily apparent from FIG. 3, this embodiment requires less signaling than the embodiment of FIG. 2. In fact, the speed-based HO adaptation can work with only one signaling message from the base station 12 to the UE 10—step 3 (in addition to the broadcasting the HO parameters throughout the cell). In the case where UE speed ranges are reported, the signaling message at step 3 has a number of bits equal to $\log_2(M)$, where M is the maximum number of ranges−1, besides the header information to indicate the type of signaling message.

A network might support one, or both of the above described embodiments. That is, the UE 10 transmitting SPEED_UE to the base station 12, or the base station 12 transmitting SPEED_BS to the UE 10. In a system that supports both embodiments, transmission of new UE speed from both sides simultaneously—a very unlikely scenario—can be avoided by setting the measurement timings of the UE speed with a small time offset, UESpeedMeasurementOffset. This parameter can also be broadcast through the cell. In addition, this would increase the robustness of the UE speed measurement, if this time offset is not too high. This caution is particularly applicable when the speed-based HO parameter adaptation is performed only after a predetermined duration after the last HO adaptation period. This period between HO adaptation instants can be HO_Adaptation_Period. This parameter can also be broadcast throughout the cell.

If a sequence of messages is exchanged between the UE 10 and base station 12, as depicted in FIGS. 2 and 3, every time the UE speed is measured, or every time the UE speed changes, the amount of signaling that is generated is significant. In addition, this signaling may delay HO execution, in the event that the UE 10 is initiating a HO procedure. One way to avoid this delay is to require that UEs 10 in a HO region, or attempting a HO, do not report SPEED_UE to the base station 12. In some embodiments, a HO region may be defined so that a UE 10 is entering a HO region when the average path loss exceeds a predetermined threshold. An alternative definition may be when the RSS from a pilot from an adjacent base station 14 has a value close to that of the RSS from the pilot originating from the serving cell, e.g., $$RSS^B \geq RSS^A - \text{thrshld}, \quad (9)$$

where $RSS^A$ is the signal strength of the pilot sequence received from the serving base station A. $RSS^B$ is the signal strength of the pilot sequence received from the adjacent base station B. and thrshld is a threshold. Values in formula (9) are given in logarithmic scale.

A formula similar to (9) may be used in cellular systems, such as 3GPP UMTS and its evolutions, to trigger the reporting of measured RSS values by UEs to the base station 12. Hence, another option for avoiding the delay imposed by a speed-based HO parameter adaptation procedure would be to prevent the UE 10 from reporting its speed when it has recently reported the measured signal strengths it has received from the cells in its measurement set.

Figure 4:
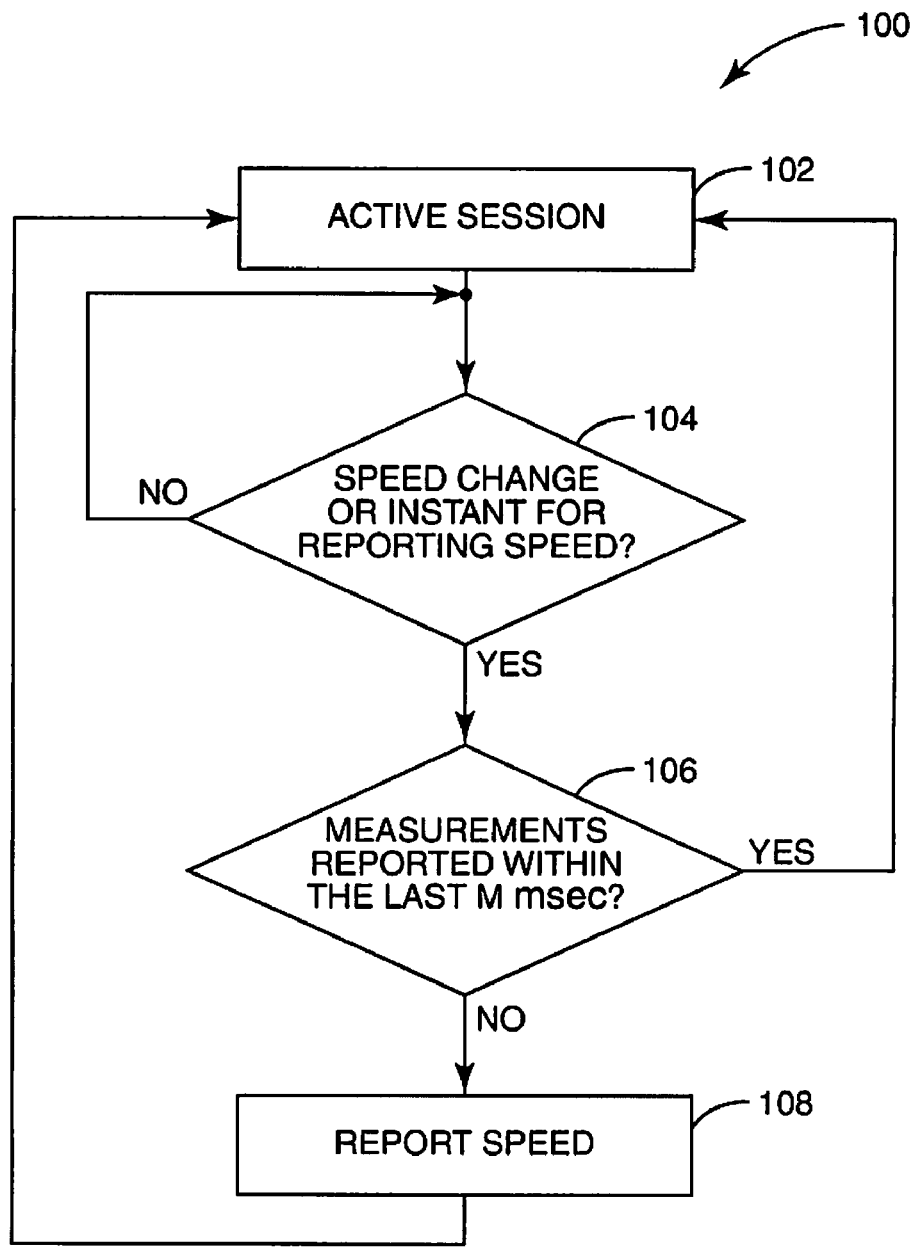
FIG. 4 is a flow diagram of a method of a UE reporting speed to a base station.

FIG. 4 is a flow diagram illustrating a method 100 for a UE 10 to report its speed in this embodiment. The UE 10 must be in an active session (block 102) to measure the RSS of an incoming pilot signal. Whenever the UE speed changes, for event triggered reporting, or when the instant for reporting speed occurs, for periodic reporting (block 104), then the UE 10 checks whether a measurement report of the RSS (or of any other HO-related measurement parameter) has been transmitted within the last M milliseconds (block 106). If the UE 10 has not transmitted a measurement report within this time window, then it reports its speed to the base station 12 (block 108). Conversely, if it has reported measurements within this time window, then it does not report its speed to the base station 12. In either case, control returns to block 102.

Another option is that the UE 10 reports its speed the first time it reports RSS measurements to the base station 12, in scenarios where measurement reporting is performed on an event-triggered basis.

Another option for reducing the signaling generated from the speed-based HO parameter adaptation of the present invention is that base stations 12 broadcast the HO and mobility parameters to be used for different UE speed ranges, and the UE 10 transmits the HO parameters it uses only when it transmits measurement reports with events detected to the base station 12.

One option for the mapping table between UE speeds and HO parameters is that the table is given from the operation and maintenance server of the network to all of the base stations 12. Hence, this mapping table is common for all of the base stations 12. This would not preclude an operator generating unique mapping tables and distributing them to selected base stations 12, if required or desired. If, for any reason, an operator estimates that these mapping tables should be exchanged among neighboring base stations 12, then this exchange could be performed using their communication interface, e.g., X2 interface in 3GPP LIE.

The procedure of adapting HO-associated parameters as a function of speed using speed measurements at both the UE 10 and base station 12 improves robustness, due to the improved accuracy of dual, independent speed measurements. Hence, once the UE 10 measures its speed and adapts its HO parameters accordingly, it is very likely that the base station 12 is aware of this HO parameters adaptation, since the base station 12 can measure the UE speed as well. Hence, for the sake of robustness and coordination (since it is likely that the base station 12 gets a report from the UE 10 containing only an event, e.g., RSS from adjacent base station 14 is higher than the RSS from the serving base station 12 by N dB), the UE 10 could indicate to the base station 12 the handover parameters it uses when it reports measurements or events.

Figure 5:
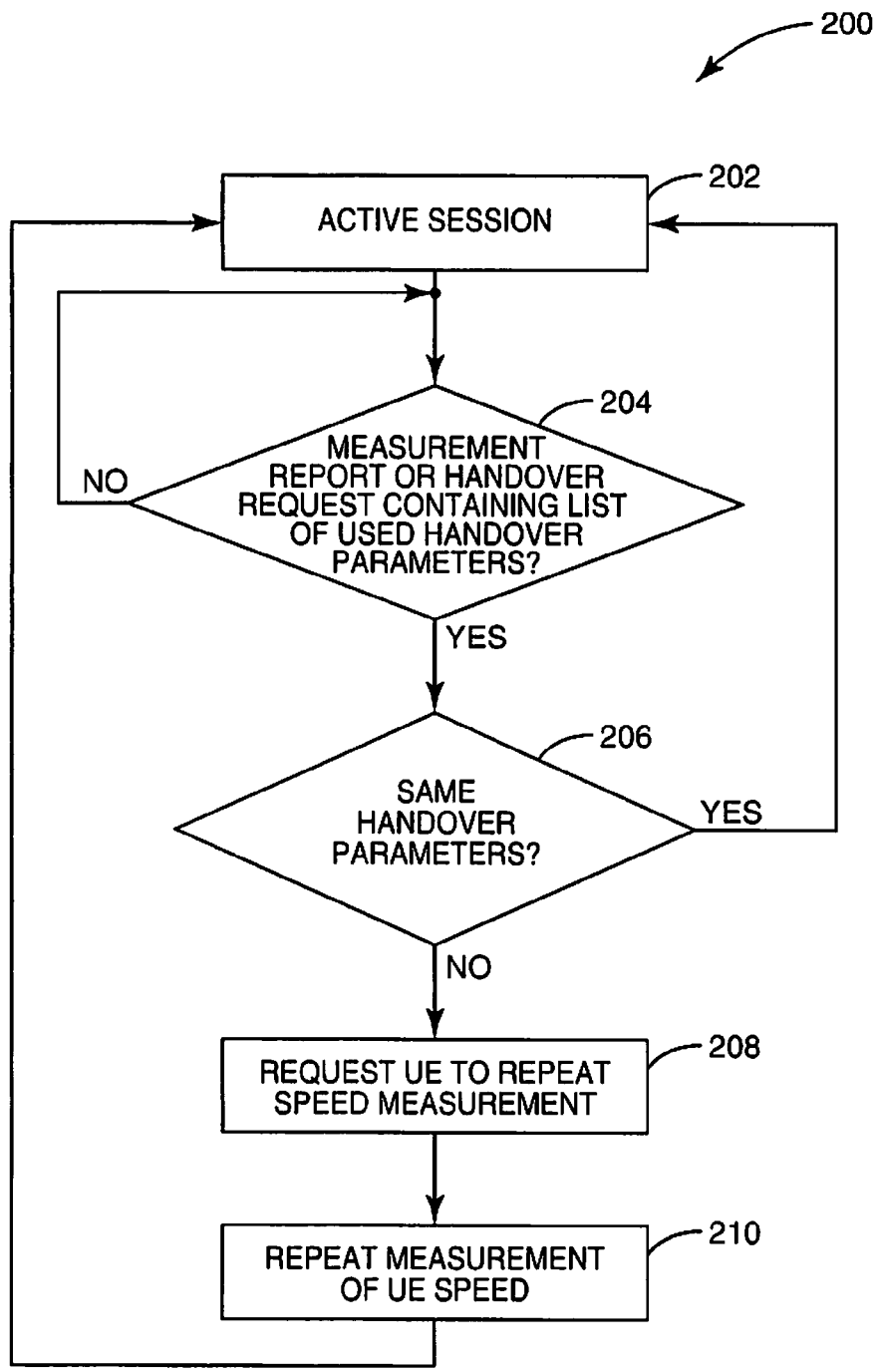
FIG. 5 is a flow diagram of a method of a base station requesting repeated speed measurement from a UE.

FIG. 5 depicts a procedure 200 according to another embodiment, in which, if the base station 12 and UE 10 measured speeds differ, new measurements are taken. The UE 10 is engaged with the base station 12 in an active session (block 202). The base station 12 receives a measurement report or HO request from a UE 10 containing HO parameters, or measured UE speed (block 204). If the HO parameters are not the same that the base station 12 generated (block 206)—that is, the UE-measured speed that generated the transmitted HO parameters is not in the same range as the base station-measured UE speed that generated its HO parameters—then the base station 12 requests the UE 10 to repeat its speed measurement (block 208). In addition, the base station 12 repeats its own UE speed measurement as well (block 210). While this embodiment increases reliability, it may increase signaling overhead and delay.

The UE speed estimation is performed by monitoring Doppler shift in a received signal over a time window, $T_w$. This parameter might be broadcasted by the base station 12, as well.

Values in the UE speed to HO parameter mapping tables should generally follow these principles: the higher the mobile terminal speed, the lower the value of TTT, $HO_{margin}$, handover prohibit timer, MeasurementReporting$_{margin}$ (in linear scale) measurement period, $T_m$, and the higher the value of the forgetting factor, $\beta$.

Another scenario is when the UE 10 is in idle mode and is expected to measure speed for the purpose of scaling, or adapting, the cell reselection related parameters (e.g. hysteresis, measurement period, Treselection, Search etc). The main limitation in idle mode is that the UE receiver becomes active mainly at the paging occasions for a very short time. This very short duration of receiver activity is not enough to track the speed based on Doppler estimation. Rather, the UE 10 generally has to keep its receiver active for several consecutive frames (e.g. 50-100 ms) so as to get some reliable speed estimation. Thus, frequent speed estimation may not be feasible from UE 10 power consumption perspective. However, occasional speed estimation could be done.

For the purpose of cell reselection, one method of speed estimation for scaling mobility related parameters is based on counting the number of cell reselections done in a given time. Although this method is slow, it is quite robust and relevant to mobility. Due to its robustness and relevance to cell reselection, this method may be utilized as the primary UE speed measurement in idle mode. However, the Doppler based speed estimation can be used as a secondary check.

Therefore, in several embodiments of the present invention, the UE 10 uses some special occasions for Doppler based speed estimation and subsequently scales the mobility related parameters accordingly. For example, the UE 10 may estimate its speed whenever it communicates with the core network, e.g., cell update, URA_update, tracking area update, etc. During such occasions, the base station 12 can also measure the speed based on Doppler estimation, since a bi-direction communication link is temporarily established. At any time, the network 8 can modify the system information and consequently request UEs 10 to read the system information via paging. Thus, another possibility is that the UE 10 estimates its speed when it has to read system information. It might be that at times (though very infrequently), the UE 10 has to stay awake for some time to carry out some pending but necessary operations, e.g., radio resource management (RRM) operations. Thus, yet another possibility is that the UE 10 does speed estimation if it has to become active for several frames for doing some necessary RRM operations (e.g. cell identification, re-synchronization, neighbor cell measurements etc).

The present invention additionally addresses the active mode discontinuous reception (DRX) scenario, where the UE 10 may not have sufficient opportunities to measure its speed. However, the UE transmitter is active all the time. Thus, the UE 10 is able to send reference or pilot symbols in the uplink. The UE DRX cycle can be adaptive between short DRX and long DRX, either by the UE, or by the network 8. In either case, the network 8 is fully aware of the currently used DRX cycle at the base station 12. Therefore when the UE DRX cycle becomes longer, the base station 12 estimates the speed based on Doppler shift in the UE pilot signal and informs the UE 10 about the relevant information. This information may comprise the estimated speed value, mobility parameter values pertaining to the speed, or a pointer to the set of mobility parameter values corresponding to a certain speed level. In case a pointer is sent, the network 8 should pre-configure the UE 10 with all possible configurations of mobility parameters for different speed levels. When the UE DRX becomes short, or the UE 10 goes into continuous mode (e.g., if there is data transmission) the UE 10 could do speed estimation and subsequently scale the parameters itself. However, this does not preclude the base station 12 from doing speed estimation and updating the UE 10 with the relevant information. In this way the correct parameters can be applied for mobility, irrespective of the UE receiver activity level.

The present invention further addresses speed estimation in uplink DPCCH discontinuous (UL DTX) transmission scenario specified in WCDMA. In UL DTX the UE transmitter is switched off during the inactive period of the DTX cycle. This means the UE 10 does not even send the uplink dedicated physical control channel (DPCCH). However, the UE receiver is still active all the time such that it can receive any data or control information from the network 8 any time. The purpose of UL DTX is to reduce uplink noise rise at the base station 12, as well as preserve UE 10 battery life. Reducing uplink noise allows more users to be admitted in the system 8 due to reduction in the uplink interference. Thus, the intention of this feature is to boost the uplink capacity.

Due to lack of uplink control channel that contains pilot symbols, the base station 12 cannot do speed estimation. However if the UE 10 has to transmit data, or control signaling in the uplink, it may transmit continuously for that period. The transmission of both data and control signaling can be either periodic or event triggered. During these active time instances, the base station 12 will be able to do speed estimation and possibly revise the mobility related parameters. In that case the base station 12 may send some information to the UEs 10. This information may comprise the estimated speed value, mobility parameter values pertaining to the speed, or a pointer to the set of mobility parameter values corresponding to a certain speed level. Again, in embodiments where a pointer is sent, the network 8 needs to pre-configure the UE 10 with all possible configurations of mobility parameters for different speed levels. On the other hand, speed estimation and subsequent adjustment of mobility parameters can be done solely by the UE 10 when it is not transmitting in the uplink. Thus both UE 10 and base station 12 estimate the speed depending upon the activity in the uplink.

Yet another scenario is when network 8 simultaneously employs both UL DTX in the uplink and UE DRX in the downlink. If there is no uplink and downlink transmission activity due to lack of data or due to lack of higher layer control signaling, then speed estimation could be done either by the UE 10 or the base station 12 whenever there is an opportunity to do so. For instance the UE 10 could do speed estimation when it measures target cells or performs cell identification of new cells. But when there is data transmission in the uplink, the base station 12 could do speed estimation and update the UE 10 with the correct mobility related parameters in the same way as described in the last paragraph (i.e. when there is only UL DTX). Of course, if the UE 10 is equipped with an independent position estimator, such as a satellite navigation signal receiver, it may measure its speed and report it to the base station 12 at the next instant of network connectivity or communication.

Techniques are known in the art that allow adaptive measurement performance, e.g., adaptive measurement period of measurement quantities, cell identification delay, etc. Typically there are two adaptive performance levels, a short, or "normal" period, and a longer, or "coarse" period/delay. In some cases, for example, the UE 10 can adapt measurement performance of a particular measurement quantity based on a comparison between serving and target cells' RSS. For instance, if there are at least N neighbor cells 14 whose received RSS is within X dB compared to the serving cell 12, then the UE 10 could measure the neighbor cells 14 less frequently. That is, coarse performance is acceptable since there are several "good" cells 14 that are likely candidates for HOs. If there are less than N such neighbor cells 14, on the other hand, the UE 10 should measure all cells 12, 14 more often. The major benefit of such a technique is that on the average this technique can save UE 10 power consumption.

In some embodiments of the present invention, relative thresholds or associated parameters used for adaptive measurement performance are also scaled with the UE speed. This is because at higher speed the thresholds should be shorter in order to speed up the measurement process. In another embodiment, DRX cycles are modified according to the UE speed. Thus, at higher speed the DRX cycle is shortened (or UE enters into non DRX mode) and also any relative thresholds or associated parameters used for adaptive measurement performance are also scaled with the speed. Similarly, at lower speed the thresholds or associated parameters used for adaptive measurement performance and DRX cycle are extended or restored to normal values.

The benefits of the techniques described herein include: HO is executed faster, HO failures are reduced, and unnecessary HOs are reduced. Depending on the implementation options chosen, the disclosed techniques might introduce signaling overhead and its associated delay. If the mechanism is implemented with the minimal signaling, then the robustness of the mechanism may be reduced. Even so, the methods disclosed herein outperform the solution without HO parameters adaptation.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention as claimed herein.

What is claimed is:

1. A method for adapting mobility parameters in a wireless communication network, comprising:
   determining a first speed estimate for a User Equipment (UE), based on measurements made at a first end of a communication link at the base station;
   receiving a second speed estimate for the UE, based on measurements made at a second end of the communication link at the UE;
   comparing the first and second speed estimates; and
   based on said comparison, adapting at least one mobility parameter.

2. The method of claim 1 wherein comparing the first and second speed estimates is performed at a base station.

3. The method of claim 2 further comprising transmitting to the UE an indication of at least one adapted mobility parameter.

4. The method of claim 1 wherein comparing the first and second speed estimates is performed at the UE.

5. The method of claim 4 further comprising transmitting to the base station an acknowledgement indicating at least one adapted mobility parameter.

6. The method of claim 1 further comprising initiating a handoff of the UE from a serving base station to a neighboring base station based on the at least one adapted mobility parameter.

7. The method of claim 1 further comprising initiating cell reselection based on the at least one adapted mobility parameter.

8. The method of claim 1 wherein adapting at least one mobility parameter based on said comparison comprises adapting at least one mobility parameter if the difference between the first and second speed estimates is less than a predetermined amount.

9. The method of claim 8 wherein adapting at least one mobility parameter comprises selecting a mobility parameter value from a pre-determined set of values, based on the first or second speed estimates.

10. The method of claim 9 further comprising classifying the UE speed into one of a plurality of speed ranges based on the first or second speed estimates, and wherein adapting at least one mobility parameter comprises selecting a mobility parameter value from a pre-determined set of values based on the speed range.

11. The method of claim 1 further comprising repeating measurements to determine at least one of the first and second speed estimates if the difference between the first and second speed estimates is greater than a predetermined amount.

12. The method of claim 1 wherein at least one of the measurements to determine the first or second speed estimates is a Doppler shift in a carrier frequency of said communication link.

13. The method of claim 1 wherein at least one of the measurements to determine the first or second speed estimates is the rate of cell reselections.

14. The method of claim 1 wherein at least one of the measurements to determine the first or second speed estimates is a measurement of satellite navigation signals.

15. The method of claim 1 wherein the mobility parameter adapted is the margin by which the received signal strength from a neighboring base station must exceed that from a serving base station to trigger a handoff or cell reselection.

16. The method of claim 1 wherein the mobility parameter adapted is a duration over which the cell reselection criteria are fulfilled.

17. The method of claim 1 wherein the mobility parameter adapted is a duration over which even conditions related to handoff is satisfied.

18. The method of claim 1 wherein the mobility parameter adapted is a memory factor that weights prior measurements in a handoff related measurement filtering calculation.

19. The method of claim 1 wherein the mobility parameter adapted is a minimum duration between two consecutive handoffs.

20. The method of claim 1 wherein the mobility parameter adapted is a threshold for serving cell signal strength or signal quality below which UE starts measuring the target cells.

21. The method of claim 1 wherein the mobility parameter adapted is a filtering duration of signal strength or signal quality measurement used for handoff or cell reselection.

22. The method of claim 1 wherein the mobility parameter adapted is a measurement duration of signal strength or signal quality used for handoff or cell reselection.

23. A method for adapting mobility parameters by a base station in a wireless communication network, comprising:
   determining a first speed estimate for a User Equipment (UE);
   receiving from the UE a second speed estimate for the UE;
   comparing the first and second speed estimates;
   if the first and second speed estimates agree within a predetermined margin, adapting at least one mobility parameter based on one of the speed estimates; and
   transmitting to the UE an indication of the adapted mobility parameter.

24. The method of claim 23 wherein transmitting to the UE an indication of the adapted mobility parameter comprises transmitting to the UE the adapted mobility parameter value.

25. The method of claim 23 wherein transmitting to the UE an indication of the adapted mobility parameter comprises transmitting to the UE an indication of which mobility parameter value to select from a pre-determined set of values.

26. The method of claim 25 further comprising, if the first and second speed estimates agree within a predetermined margin, classifying the UE speed into one of a plurality of speed ranges, and wherein transmitting to the UE an indication of which mobility parameter value to select from a pre-determined set of values comprises transmitting to the UE the UE speed range.

27. The method of claim 23 further comprising, if the first and second speed estimates do not agree within a predetermined margin, requesting the UE to repeat a determination of the second speed estimate.

28. A method for adapting mobility parameters by a User Equipment (UE) in a wireless communication network, comprising:
   determining a first speed estimate for the UE;
   receiving from a base station a second speed estimate for the UE;
   comparing the first and second speed estimates; and
   if the first and second speed estimates agree within a predetermined margin, adapting at least one mobility parameter based on one of the speed estimates.

29. The method of claim 28 further comprising transmitting to the base station an acknowledgement indicating at least one adapted mobility parameter.

30. The method of claim 28 wherein receiving from a base station a second speed estimate for the UE comprises receiving from a base station an indication of one of a plurality of speed ranges into which the second speed estimate is classified.

31. A wireless communication network base station configured to adapt mobility parameters by:
   determining a first speed estimate for a User Equipment (UE);
   receiving from the UE a second speed estimate for the UE;
   comparing the first and second speed estimates;
   if the first and second speed estimates agree within a predetermined margin, adapting at least one mobility parameter based on one of the speed estimates; and
   transmitting to the UE an indication of the adapted mobility parameter.

32. A User Equipment (UE) for a wireless communication network, the UE configured to adapt mobility parameters by:
   determining a first speed estimate for the UE;
   receiving from a base station a second speed estimate for the UE;
   comparing the first and second speed estimates; and
   if the first and second speed estimates agree within a predetermined margin, adapting at least one mobility parameter based on one of the speed estimates.

* * * * *

UNITED STATES PATENT AND TRADEMARK OFFICE
CERTIFICATE OF CORRECTION

PATENT NO.        : 8,369,857 B2
APPLICATION NO.   : 12/740558
DATED             : February 5, 2013
INVENTOR(S)       : Dimou et al.

Page 1 of 1

It is certified that error appears in the above-identified patent and that said Letters Patent is hereby corrected as shown below:

On Title Page 2, item (56), under "OTHER PUBLICATIONS", in Column 2, Line 2, delete "15tth" and insert -- 15th --, therefor.

In the Specification:

In Column 3, Line 48, delete "LIE" and insert -- UE --, therefor.

In Column 4, Line 34, delete "RSS((n-1)nT$_m$)." and insert -- RSS((n-1)T$_m$). --, therefor.

In Column 4, Line 54, delete "TTT value, in" and insert -- TTT value, i.e., in --, therefor.

In Column 4, Line 56, delete "ITS" and insert -- TTS --, therefor.

In Column 5, Line 13, delete "Ssearch:" and insert -- Search: --, therefor.

In Column 5, Line 17, delete "criteria" and insert -- criteria. --, therefor.

In Column 5, Line 19, delete "cells" and insert -- cells. --, therefor.

In Column 5, Line 26, delete "parameters" and insert -- parameter --, therefor.

In Column 7, Line 44, delete "fm," and insert -- f$_m$, --, therefor.

In Column 10, Line 32, delete "LIE." and insert -- LTE. --, therefor.

Signed and Sealed this
Sixteenth Day of July, 2013

Teresa Stanek Rea
*Acting Director of the United States Patent and Trademark Office*